UNITED STATES PATENT OFFICE.

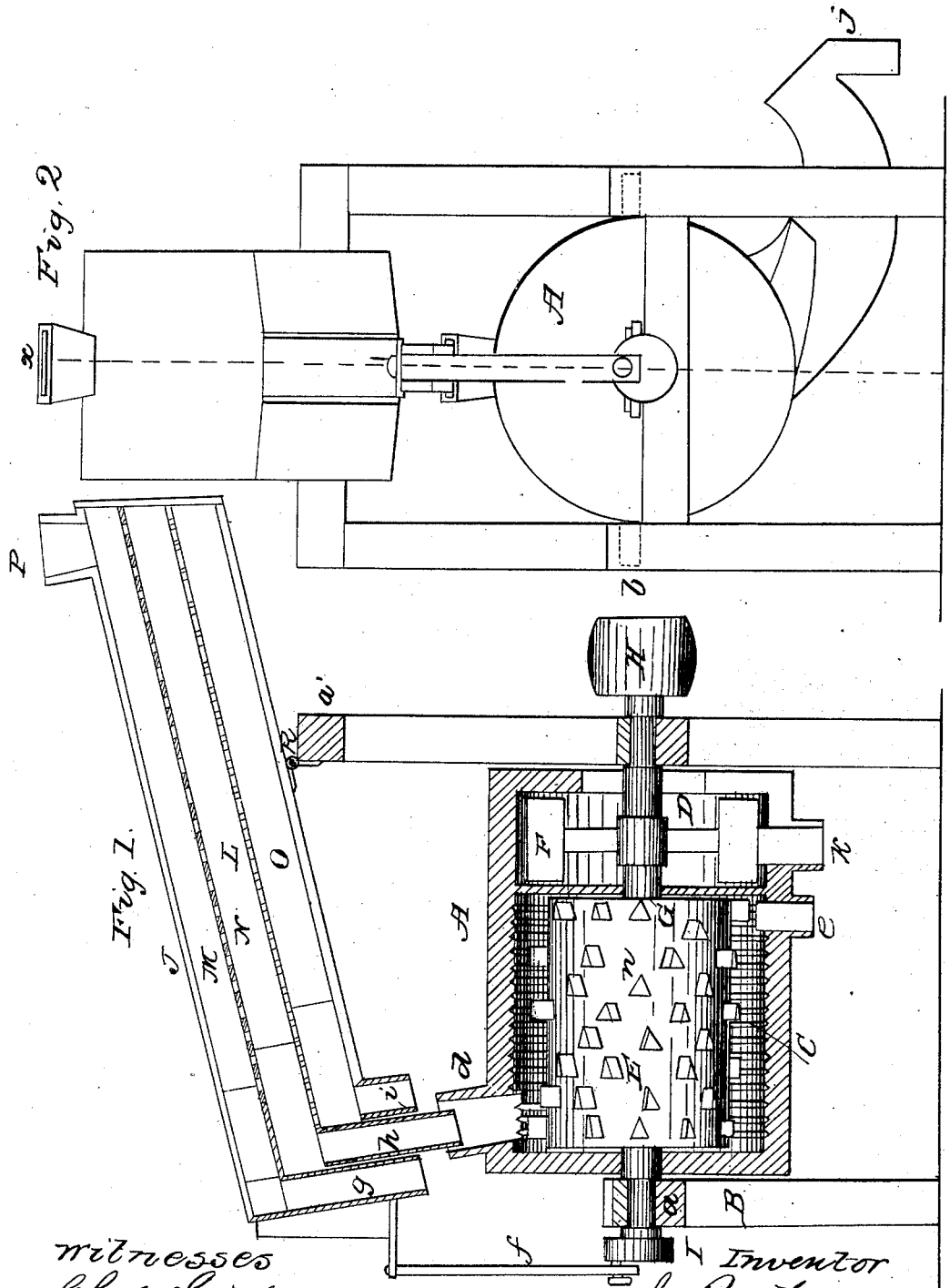

JEREMIAH ROUTH, OF GRAYVILLE, ILLINOIS.

IMPROVEMENT IN COMBINED SMUT MACHINE AND SEPARATOR.

Specification forming part of Letters Patent No. 38,128, dated April 7, 1863.

*To all whom it may concern:*

Be it known that I, JEREMIAH ROUTH, of Grayville, in the county of White and State of Illinois, have invented a new and Improved Smut Machine and Separator Combined; and I do hereby declare that the following is a full, clear, and exact description of the same, reference being had to the accompanying drawings, making part of this specification, in which—

Figure 1 represents my improved machine by a vertical longitudinal section in the line $x\,x$ of Fig. 2. Fig. 2 is a front end elevation of the same.

Similar letters of reference indicate corresponding parts in the two figures.

My invention consists, first, in a shaking-shoe of peculiar construction provided with screens for separating weeds, cheat, cockle, and other extraneous matter from wheat, in combination with a certain device for scouring the wheat; second, in the combination of a triangular toothed cylinder and circumferentially-grooved case, in which it revolves, with receiving and delivery spouts and fan for separating the smut and dust from the wheat after it has passed through the scouring operation, as will be hereinafter explained.

To enable others skilled in the art to fully understand my invention, I will proceed to describe its construction and operation.

A represents a cylindrical box or case, of cast-iron or other material, supported by means of lugs $b$ (shown by dotted lines in Fig. 2) on the side pieces of the frame B. The interior of the case A is divided by means of a partition, $c$, into two compartments, C D, within which is adapted to revolve the scouring drum or cylinder E and fan F, respectively. The case A, at its front end and on top, is provided with a receiving-spout, $d$, and at its rear end and bottom side with discharge-spouts $e\,k$, communicating with each other and with the compartments C D, respectively.

G is a shaft journaled in boxes $d\,d$, and having keyed or otherwise suitably affixed to it a drum, E, and fan F. The drum E is of considerable less diameter than the inner diameter of the case, and bestudded on its circumference with triangular teeth $n$, so set as to have one side of each at right angles with the axis of the drum E, for the purpose hereinafter to be explained. The shaft G, on one end, is provided with a band-pulley, H, and on its opposite end with a crank-wheel, I, which latter is connected through the medium of a rod or pitman, $f$, with a shoe, J, to which it imparts a vibratory or shaking motion.

J is an oblong rectangular box or shoe attached by a hinge or hinges, R, to the cross-piece $a'$ of the and having fixed within it two screens, K L. The upper screen, K, is perforated with holes of sufficient size to allow wheat, cheat, cockle, &c., to pass readily through them, and small enough to prevent weeds passing through them. The lower screen L is perforated with long, narrow openings or slits disposed in lines extending alternately across and lengthwise of the shoe. These screens divide the shoe into three compartments, M N O, which discharge at their lower ends through spouts $g\,h\,i$, respectively. The upper and back end of the shoe J is provided with a hopper, P, into which the grain to be separated and cleaned is emptied.

The inner surface of the compartment C is grooved circumferentially to prevent the too rapid advancement of the grain toward the discharge-spout $e$, thereby subjecting it for a longer period to the action of the scouring-cylinder.

The operation of my invention is as follows: The machine being put in motion, the wheat, and refuse mixed with it, is poured into the hopper P, whence it falls onto the screen K. The wheat, cheat, cockle, &c., passes through the perforations of this screen onto the screen L; but any weeds mixed with the wheat descend to the lower end of the shoe, owing to its inclined position and shaking motion imparted to it and discharges through spout $g$ onto the floor or ground beside the machine. The perforations of the screen L are too fine to permit the wheat to pass through them; consequently it is carried down by the inclined position of the screen and the shaking motion of the shoe and discharged into the compartment C of the case A. The particles of dust and other refuse matter smaller than the wheat, being separated therefrom by the screen L, escape through spout $i$, whence it falls to the ground. The wheat entering the compartment C is subjected to the action of the teeth $n$ of the scouring-cylinder, the effect of which is to remove the smut and dust adhering to it, and at the same time to advance the same toward the delivering-spout e, through which it descends into the spout f, where it is met by the current or blast of air created by the fan. This current of air separates all the dust and remaining refuse matter from the wheat and forces it up to the mouth of the attached spout j, whence it descends into a proper receptacle in condition for market.

Having thus described my invention, what I claim as new, and desire to secure by Letters Patent, is—

The shoe J, provided with screens K L, which divide it into compartments M N O, terminating at their lower end into discharge-spouts g h i, respectively, and vibrating on hinge R, in combination with the case A, scouring-cylinder E, shaft G, and crank-wheel I, when the whole are arranged in the manner and for the purpose specified.

JEREMIAH ROUTH.

Witnesses:
 MICHAEL SMITH,
 A. A. WHITE.